United States Patent [19]

Ritsema

[11] 4,019,611
[45] Apr. 26, 1977

[54] DISC BRAKE

[75] Inventor: Irving R. Ritsema, South Bend, Ind.

[73] Assignee: The Bendix Corporation, South Bend, Ind.

[22] Filed: Mar. 15, 1976

[21] Appl. No.: 666,833

[52] U.S. Cl. .............................. 188/73.3; 188/26; 188/71.8; 188/344

[51] Int. Cl.$^2$ .................. F16D 55/224; B62L 1/00

[58] Field of Search ............... 188/72.4, 73.3, 344, 188/26, 71.8, 196 P

[56] References Cited

FOREIGN PATENTS OR APPLICATIONS 1,378,479  12/1974  United Kingdom ............ 188/73.3

*Primary Examiner*—Duane A. Reger
*Attorney, Agent, or Firm*—Ken C. Decker; William N. Antonis; Paul David Schoenle

[57] ABSTRACT

A disc brake for a two-wheeled vehicle, such as a motorcycle, is disclosed. The brake includes a torque member fastened to a non-rotative part of the vehicle, a two-piece caliper carried by the torque member, and a pair of pins carried by the caliper which slidably support a pair of friction elements adjacent opposed friction faces of a convention disc brake rotor. In one embodiment of the invention, the torque member is rigidly secured to the pins, a sliding connection being provided between the pins and the caliper to permit the latter to slide axially with respect to the rotor. Bolts are provided to hold the pieces of the caliper together. In the other embodiment of the invention, the torque member and the caliper are integral with one another, and the attachment between the torque member and the vehicle permits the brake to move axially with respect to the rotor. In this embodiment, the pins which slidably support the friction elements are bolts which also hold the two pieces of the caliper together.

4 Claims, 5 Drawing Figures

DISC BRAKE

BACKGROUND OF THE INVENTION

This invention relates to a disc brake for a vehicle.

Because of their inherent advantages, disc brakes are being increasingly used on all types of motor vehicles, including two-wheeled vehicles, such a motorcycles. Motorcycle disc brakes, however, are designed so that they are much smaller than passenger car disc brakes, in order to save weight and also because the smaller size brakes will provide sufficient stopping capability for a motorcycle. Furthermore, a smaller, lighter, and more simple disc brake is desirable for motorcycles in order to minimize cost.

SUMMARY OF THE INVENTION

Therefore, an important object of this invention is to design a disc brake for two-wheeled vehicles, such as motorcycles, which is less complicated than prior art disc brakes.

Another important object of this invention is to design a motorcycle disc brake which is less expensive than prior art disc brakes.

A still further object of this invention is to design a lightweight disc brake for motorcycles.

Still another object of this invention is to insure even lining wear of the friction elements.

DESCRIPTON OF THE DRAWINGS

DETAILED DESCRIPTION OF THE PREFERRED EMBODIMENT

Figure 1:
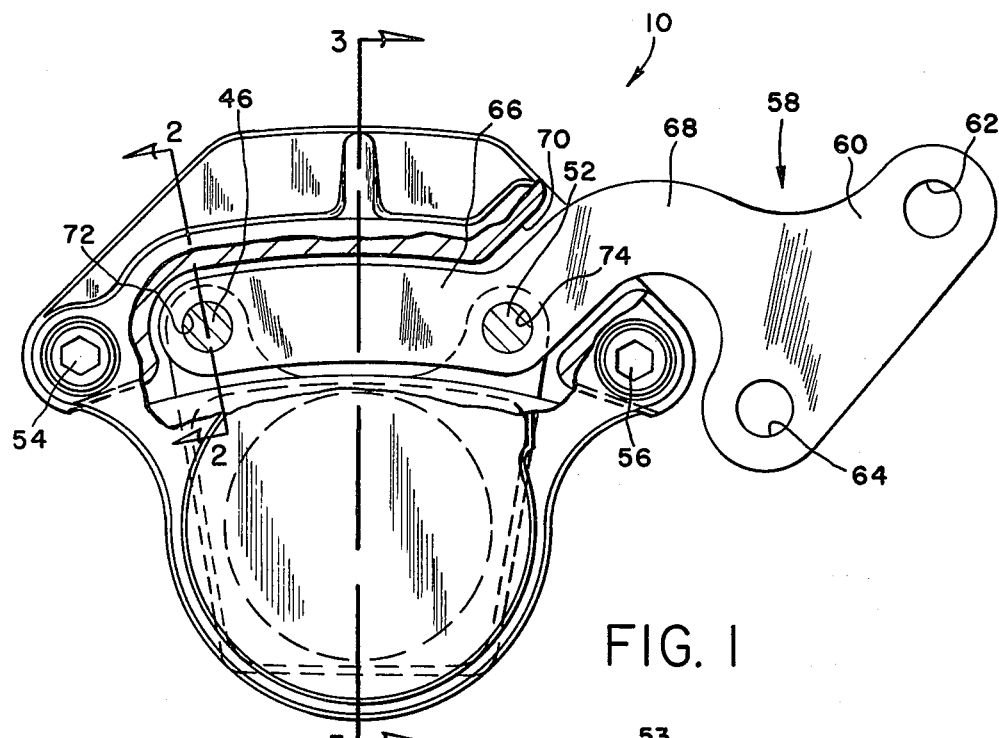
FIG. 1 is a transverse cross-sectional view of a disc brake made pursuant to the teachings of my present invention.
Figure 2:
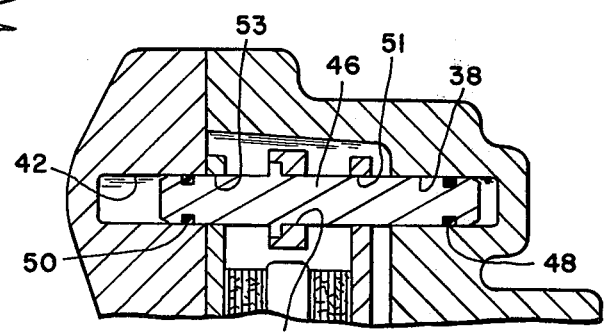
FIG. 2 is a fragmentary cross-sectional view taken substantially along lines 2—2 of FIG. 1.
Figure 3:
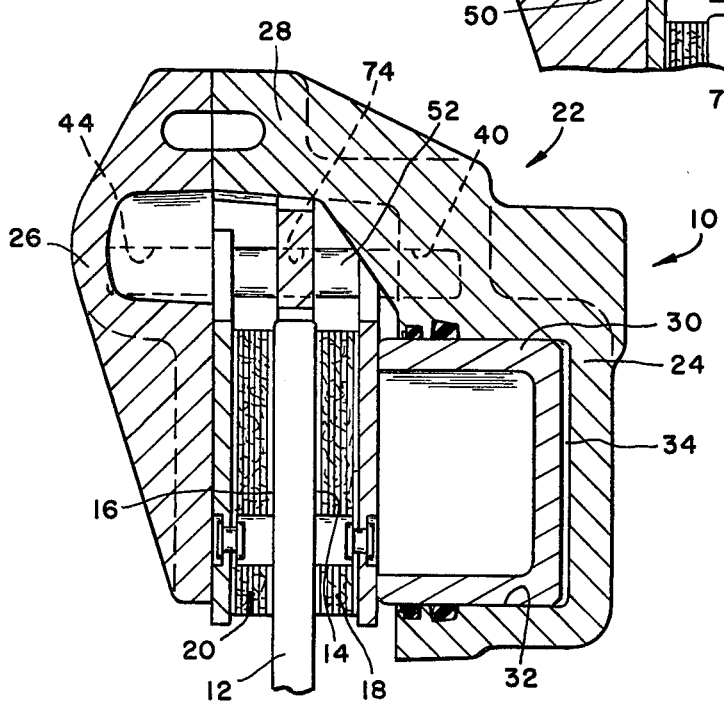
FIG. 3 is a cross-sectional view taken substantially along lines 3—3 of FIG. 1.

Referring now to FIGS 1-3 of the drawings, a disc brake generally indicated by the numeral 10 includes a rotor 12 which is mounted for rotation with a member to be braked, such as the wheel of a motorcycle. The rotor 12 defines a pair of opposed friction faces 14, 16 on opposite sides thereof. A pair of friction elements 18, 20 are disposed adjacent friction faces 14 and 16 and are adapted to be urged thereagainst when a brake application is effected, whereby frictional engagement of the friction elements 18 and 20 with the friction faces 14 and 16 retard rotation of the rotor 12.

The friction elements 18, 20 are urged against the friction faces 14 and 16 by a caliper generally indicated by the numeral 22. The caliper 22 includes a pair of radially inwardly extending portions 24, 26 which extend generally parallel to the friction faces 14, 16, respectively, and which operatively engage the friction elements 18, 20. Caliper 22 further includes a bridge portion 28 which traverses the periphery of the rotor 12 and which interconnects the inwardly extending portions 24, 26. The inwardly extending portion 24 includes a conventional fluid motor assembly consisting of a piston 30 slidably received in a bore 32 which cooperates with the closed end of the bore 32 to define a variable volume chamber 34 therebetween. The chamber 34 is communicated to a source of fluid pressure, such as the vehicle master cylinder. Piston 30 also engages the friction element 18 to urge the latter against the rotor 12 when a brake application is effected. The caliper 22 is divided into two pieces, one piece consisting of the inwardly extending portion 24 and the bridge portion 28, and the other piece consisting of the inwardly extending portion 26. A pair of bores 38, 40 are defined in the inwardly extending portion 24 which register with corresponding bores 42, 44 in the inwardly extending portion 26. Opposite ends of a pin 46 are slidably received in the bores 38, 42, and are provided with seals 48, 50 which prevent contaminants from interfering with the sliding fit between the pin and the bores and which also perform a noise abatement and pin alignment function. If necessary, the cavities defined between the ends of the pins and their corresponding bores may be vented to prevent creation of a vacuum in these cavities. Bores 40 and 44 receive corresponding opposite ends of another pin 52. Consequently, the caliper 22 is able to slide axially with respect to the rotor 12 on the pins 46, 52. Friction elements 18, 20 are provided with apertures 51, 53 which slidably receive the pins 46, 52 so that the friction elements slide on the pins when a brake application is effected. After the pins are installed in the caliper, the two pieces of caliper are held together by bolts 54, 56.

Brake 10 further includes a torque member generally indicated by the numeral 58. Torque member 58 includes a mounting portion 60, which is rigidly secured to a non-rotative portion of the vehicle by bolts (not shown) extending through bolt holes 62, 64. Torque member 58 further includes a portion 66 which is disposed in the space defined between the outer circumferential surface of the rotor and the bridge portion 28 of the caliper, and a connecting portion 68 which extends through an aperture 70 provided in the bridge portion 28 and which interconnects the mounting portion 60 and the portion 66. The portion 66 includes apertures 72, 74 through which the pins 46, 52 extend. The pins are rigidly connected to the portion 66 of the torque member 58, so that the pins are restrained against relative movement with respect to the torque member.

MODE OF OPERATION OF THE PREFERRED EMBODIMENT

When a brake application is effected, fluid pressure is communicated from the vehicle's master cylinder into the variable volume chamber 34, where it acts upon the piston 30 urging the latter to the left, viewing FIG. 3. Movement of piston 30 to the left urges the friction element 18 into frictional engagement with the friction face 14. Because of the slidable connection between the pins 46, 52, and their corresponding bores 38, 42 and 40, 44, reaction forces transmitted through the bridge portion 28 acting through the inwardly extending portion 26, 16 urge friction element 20 into frictional engagement with friction face 16. It will be noted that, because of this sliding connection between the pins 46, 52 and their corresponding bore, that the caliper 22 will automatically reposition itself as the friction elements 18, 20 wear. It is for this reason that the bores 42, 44 are made substantially deeper than the ends of the pins 46, 42. As the friction elements 18, 20 wear, the pins 46, 52 will extend more deeply into their corresponding bores 42, 44, and will extend out of their corresponding bores 38, 40.

DETAILED DESCRIPTION OF THE ALTERNATE EMBODIMENT

Figure 4:
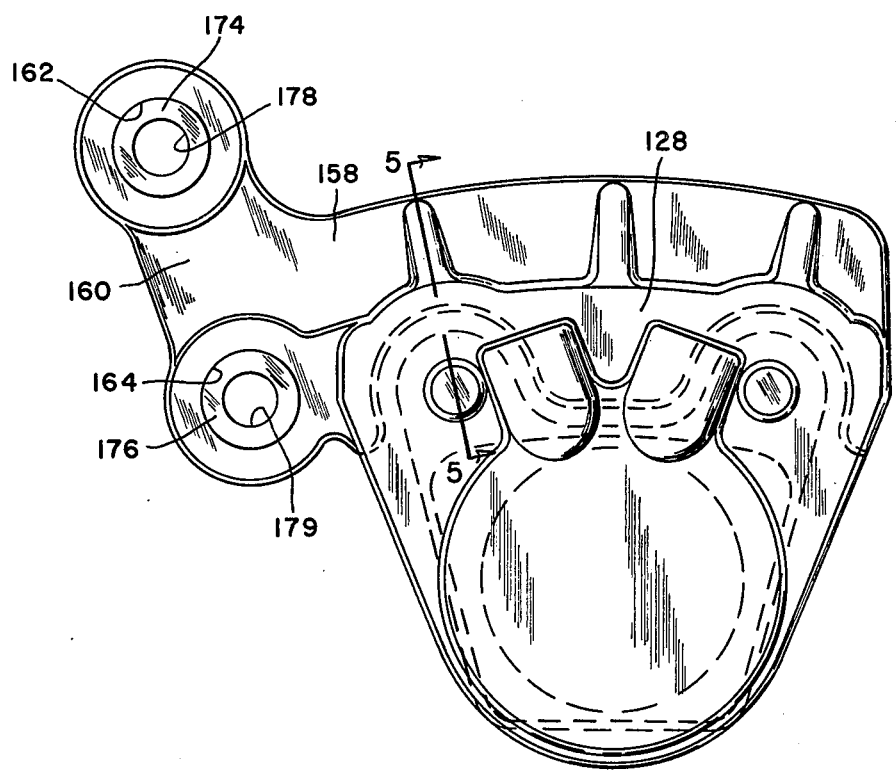
FIG. 4 is a view similar to FIG. 1, but illustrating a different embodiment of my invention.
Figure 5:
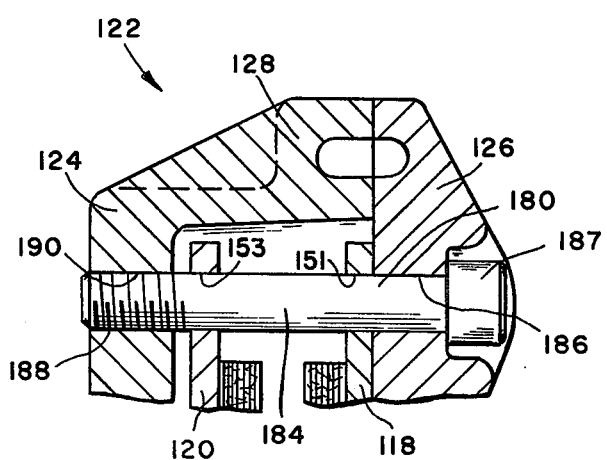
FIG. 5 is a fragmentary cross-sectional view taken substantially along lines 5—5 of FIG. 4.

In the alternate embodiment of FIGS. 4 and 5, elements substantially the same as those in the preferred embodiment retain the same reference characters, but are increased by 100. Referring now to FIGS. 4 and 5 of the drawing, the torque member 158 is made integral with the bridge portion 128 of the caliper 122. Therefore, a slidable connection must be provided between the torque member 158 and the non-rotative part of the vehicle. This slidable connection consists of sleeves 174, 176 which are slidably received within the mounting apertures 162, 164 in the mounting portion 160 of the torque member 158. Bolts (not shown) are inserted through the openings 178, 180 to attach the latter to the non-rotative portion of the vehicle. Therefore, the torque member 158 and the caliper 122 are able to slide on the outer diameter of the sleeves 174, 176 in the way best illustrated in U.S. patent application Ser. No. 618,705, filed Oct. 1, 1975, owned by the assignee of the present invention and incorporated herein by reference. Instead of being supported on the pins 46, 52, as in the preferred embodiment, the friction elements 118, 120 of the embodiment of FIG. 4 and 5 are supported on bolts 180, 182. Each of the bolts 180, 182 includes a shank portion 184 which extends through a bore 186 provided in the inwardly extending portion 126 and which also extends through corresponding apertures 151, 153 provided in the friction elements 118 and 120 so that the latter may slide on the shank portion 184. Bolt 180 further includes a head 186 which engages the portion 126, and the shank 184 includes a threaded portion 188 which threadedly engages a bore 190 provided in the inwardly extending portion 124. Consequently, the bolts 180, 182 not only slidably support the friction elements 118, 120 but also perform the function performed by the bolts 54, 56 of the preferred embodiment of holding the pieces of the caliper together.

The disc brake disclosed in the embodiment of FIGS. 4 and 5 operates in a way analogous to the manner in which the brake of the embodiment of FIGS. 1 and 4 operates. However, because the torque member 158 is integral with the caliper 122, slidable movement will occur between the sleeves 174, 176 and the apertures 162, 164, instead of between the opposite ends of the pins 46, 42 and their respective bores as occurs in the preferred embodiment.

I claim:
1. In a disc brake for a vehicle:
a rotor mounted for rotation with a member to be braked and having a pair of opposed friction faces;
a pair of friction elements carried adjacent said friction faces and adapted frictionally engage said opposed friction faces when a brake application is effected;
a torque member secured to a non-rotative portion of the vehicle;
a pair of pins carried by said torque member and restrained against relative movement with respect thereto, said pins being circumferentially spaced and extending axially with respect to said rotor, said friction elements having apertures for slidably mounting said friction elements on said pins;
a caliper carried by said torque member, said caliper having a pair of inwardly extending portions disposed adjacent said friction elements for urging the latter into braking engagement with their corresponding friction faces, said caliper further including a bridge portion traversing the periphery of said rotor and interconnecting said inwardly extending portions, and fluid motor means carried by the caliper for effecting a brake application;
each of said inwardly extending portions defining corresponding bores therein located radially outwardly of said periphery of the rotor, the bores in one of said inwardly extending portions registering with corresponding bores in the other portion, said registering bores receiving opposite ends of said pins, said pins extending through the apertures on said friction elements and into the registering bores on said caliper for slidably mounting the friction elements and the caliper on said pins.

2. In a disc brake for a vehicle:
a rotor mounted for rotation with a member to be braked and having a pair of opposed friction faces;
a pair of friction elements carried adjacent said friction faces and adapted to frictionally engage said opposed friction faces when a brake application is effected;
a torque member secured to a non-rotative portion of the vehicle;
a pair of pins carried by said torque member and restrained against relative movement with respect thereto, said pins being circumferentially spaced and extending axially with respect to said rotor, said friction elements being slidably mounted on said pins;
a caliper carried by said torque member, said caliper having a pair of inwardly extending portions disposed adjacent said friction elements for urging the latter into braking engagement with their corresponding friction faces, said caliper further including a bridge portion traversing the periphery of said rotor and interconnecting said inwardly extending portions, and fluid motor means carried by the caliper for effecting a brake application;
each of said inwardly extending portions defining corresponding bores therein located radially outwardly of said periphery of the rotor, the bores in one of said inwardly extendng portions registering with corresponding bores in the other portion, said registering bores receiving opposite ends of said pins;
said caliper being integral with said torque member and
means mounting said torque member to said non-rotative portion of said vehicle, said mounting means permitting axial movement with respect to the rotor of said torque member and the caliper integral therewith.

3. The invention of claim 2:
said caliper including at least two pieces;
said pin means including a threaded portion threadedly engaging one of said pieces and an enlarged portion engaging the other piece, whereby said pin means holds the pieces of the caliper together.

4. The invention of claim 2:
said caliper including two separable pieces, the bores in said one inwardly extending portion of the caliper being located on one piece of the caliper and the bores on the other inwardly extending portion being located on a different piece of the caliper;
said pin means including means for holding said pieces of the caliper together.

* * * * *